(12) United States Patent
Wi

(10) Patent No.: US 9,488,197 B2
(45) Date of Patent: Nov. 8, 2016

(54) HYDRAULIC CIRCUIT FOR AUTOMATIC TRANSMISSION

(71) Applicant: Hyundai Motor Company, Seoul (KR)

(72) Inventor: Taehwan Wi, Bucheon-si (KR)

(73) Assignee: Hyundai Motor Company, Seoul (KR)

(*) Notice: Subject to any disclaimer, the term of this patent is extended or adjusted under 35 U.S.C. 154(b) by 196 days.

(21) Appl. No.: 14/099,709

(22) Filed: Dec. 6, 2013

(65) Prior Publication Data

US 2015/0013796 A1 Jan. 15, 2015

(30) Foreign Application Priority Data

Jul. 10, 2013 (KR) .................. 10-2013-0081047

(51) Int. Cl.
*F15B 20/00* (2006.01)
*F15B 13/044* (2006.01)
*F16D 48/02* (2006.01)

(52) U.S. Cl.
CPC .......... *F15B 13/0442* (2013.01); *F16D 48/02* (2013.01); *F15B 2211/30515* (2013.01); *F15B 2211/30525* (2013.01); *F15B 2211/655* (2013.01); *F15B 2211/85* (2013.01); *F16D 2048/0278* (2013.01); *F16D 2500/1085* (2013.01); *F16D 2500/5118* (2013.01); *Y10T 137/87193* (2015.04); *Y10T 137/87209* (2015.04); *Y10T 137/87217* (2015.04)

(58) Field of Classification Search
CPC .............. Y10T 137/87193; Y10T 137/87209; Y10T 137/87217; F15B 2211/30515; F15B 2211/30525; F15B 2211/655; F15B 13/0442; F15B 2211/85; F16D 48/06; F16D 2048/0278; F16D 48/02; F16D 2500/1085; F16D 2500/5118

USPC .............. 137/596.14, 596.16, 238; 60/454; 91/445; 192/3.33

See application file for complete search history.

(56) References Cited

U.S. PATENT DOCUMENTS

| | | | | |
|---|---|---|---|---|
| 2,237,264 A * | 4/1941 | Price | ............... | 477/79 |
| 3,006,213 A * | 10/1961 | Wilson | ............ | 477/154 |
| 3,322,248 A * | 5/1967 | Kaptur et al. | ............... | 192/3.58 |
| 5,060,769 A * | 10/1991 | Yoshimura et al. | ......... | 192/3.29 |
| 5,383,379 A * | 1/1995 | Niiyama | ...................... | 74/733.1 |
| 5,934,322 A * | 8/1999 | Oehme | .................... | 137/625.64 |
| 5,934,427 A * | 8/1999 | Takagi | .......................... | 192/3.3 |
| 6,443,275 B1 * | 9/2002 | Hori et al. | ................... | 192/3.33 |
| 7,282,005 B2 * | 10/2007 | Shimizu et al. | ............... | 475/127 |
| 8,172,060 B2 * | 5/2012 | Seid et al. | ................. | 192/85.63 |
| 8,225,915 B2 * | 7/2012 | Ames et al. | ................. | 192/3.25 |

(Continued)

FOREIGN PATENT DOCUMENTS

| | | |
|---|---|---|
| JP | 5-180332 A | 7/1993 |
| JP | 2006-46440 A | 2/2006 |

(Continued)

*Primary Examiner* — Craig J Price
(74) *Attorney, Agent, or Firm* — Morgan, Lewis & Bockius LLP

(57) ABSTRACT

A hydraulic circuit may include a proportional control solenoid valve controlling hydraulic pressure such that an operating hydraulic pressure required by the friction member is supplied to the friction member; a supply hydraulic path connecting the proportional control solenoid valve with the friction member, and adapted to supply hydraulic pressure controlled by the proportional control solenoid valve to the friction member; and a switch valve disposed in the supply hydraulic path so as to selectively open/close the supply hydraulic path.

6 Claims, 2 Drawing Sheets

(56) References Cited

U.S. PATENT DOCUMENTS

| | | | |
|---|---|---|---|
| 8,347,918 B2* | 1/2013 | Shimizu et al. | 137/625.65 |
| 8,733,521 B2* | 5/2014 | Moorman et al. | 192/3.58 |
| 2003/0116010 A1* | 6/2003 | Kim | 91/445 |
| 2004/0214686 A1* | 10/2004 | Katou | 477/98 |
| 2007/0221467 A1* | 9/2007 | Stevenson et al. | 192/85 R |
| 2008/0190729 A1* | 8/2008 | Stehr et al. | 192/85 R |
| 2009/0093338 A1* | 4/2009 | Takahashi et al. | 477/51 |
| 2011/0139564 A1* | 6/2011 | Czoykowski | F16D 21/06 192/48.601 |
| 2011/0180364 A1* | 7/2011 | Czoykowski et al. | 192/85.63 |
| 2012/0138415 A1* | 6/2012 | Yagi | 192/85.63 |
| 2013/0213760 A1* | 8/2013 | Wilson et al. | 192/85.63 |
| 2014/0124324 A1* | 5/2014 | Wada et al. | 192/85.63 |

FOREIGN PATENT DOCUMENTS

| | | |
|---|---|---|
| JP | 3998567 B2 | 8/2007 |
| JP | 2009-115115 A | 5/2009 |
| JP | 2009-168152 A | 7/2009 |
| KR | 10-0890420 B1 | 3/2009 |

\* cited by examiner

HYDRAULIC CIRCUIT FOR AUTOMATIC TRANSMISSION

CROSS-REFERENCE TO RELATED APPLICATION

The present application claims priority to Korean Patent Application No. 10-2013-0081047 filed on Jul. 10, 2013, the entire contents of which is incorporated herein for all purposes by this reference.

BACKGROUND OF THE INVENTION

1. Field of the Invention

The present invention relates to a hydraulic circuit for an automatic transmission. More particularly, the present invention relates to a hydraulic circuit for an automatic transmission in which foreign materials having flowed into a circuit can be easily removed.

2. Description of Related Art

Generally, an automatic transmission provides convenient driving by achieving automatic shifting to a target shift speed as a consequence of the target shift speed being derived from a predetermined shifting pattern based on a vehicle speed and variation of a throttle opening, and then operational elements being controlled according to a hydraulic duty of the target shift speed. The automatic transmission includes a plurality of friction members, such as a clutch or a brake, operated by hydraulic pressure so as to realize various shift speeds.

However, if foreign materials enter into a hydraulic circuit for an automatic transmission provided for supplying hydraulic pressure to the plurality of friction members, performance of the automatic transmission may be deteriorated or a bad shifting may be generated. Particularly, driver satisfaction may be deteriorated and a serious accident may occur because of the bad shifting.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a hydraulic circuit for an automatic transmission having advantages of rapidly and effectively removing foreign materials having flowed into a circuit.

The hydraulic circuit for an automatic transmission according to an exemplary embodiment of the present invention may be adapted to supply hydraulic pressure to a plurality of friction members which are provided in an automatic transmission so as to realize a plurality of shift speeds. The hydraulic circuit may include a proportional control solenoid valve controlling hydraulic pressure such that an operating hydraulic pressure required by the friction member is supplied to the friction member, a supply hydraulic path connecting the proportional control solenoid valve with the friction member, and adapted to supply hydraulic pressure controlled by the proportional control solenoid valve to the friction member, and a switch valve disposed in the supply hydraulic path so as to selectively open/close the supply hydraulic path.

The hydraulic circuit may further include an inflow hydraulic path provided for supplying oil to the proportional control solenoid valve, and an outflow hydraulic path provided for exhausting oil from the proportional control solenoid valve.

A hydraulic pressure supplied to the friction member may be controlled according to oil flowing into the proportional control solenoid valve through the inflow hydraulic path and oil exhausted from the proportional control solenoid valve through the outflow hydraulic path.

The hydraulic circuit may further include an on/off solenoid valve operating the switch valve, and an elastic member provided for returning the switch valve to its original position.

The switch valve may include an opening unit formed to open the supply hydraulic path when it is selectively disposed in the supply hydraulic path, and a closing unit formed to close the supply hydraulic path when it is selectively disposed in the supply hydraulic path, wherein the closing unit may be disposed in the supply hydraulic path if the switch valve is operated, and the opening unit may be disposed in the supply hydraulic path if the switch valve returns to its original position.

An operation to remove foreign materials having flowed into the proportional control solenoid valve may be performed in a state of closing the supply hydraulic path.

The proportional control solenoid valve may include a spool which reciprocates in the proportional control solenoid valve such that operating hydraulic pressure generated from the proportional control solenoid valve is controlled, and foreign materials having flowed into the proportional control solenoid valve may be removed by the reciprocal motion of the spool in the state of closing the supply hydraulic path.

The switch valve may be provided in plural such that at least one of the switch valves can be disposed to each supply hydraulic path connected with the friction member, and at least two switch valves may be connected with one on/off solenoid valve.

Foreign materials having flowed into the proportional control solenoid valve which is connected with all friction members may be simultaneously removed in a case in which the plurality of switch valves are connected with one on/off solenoid valve.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
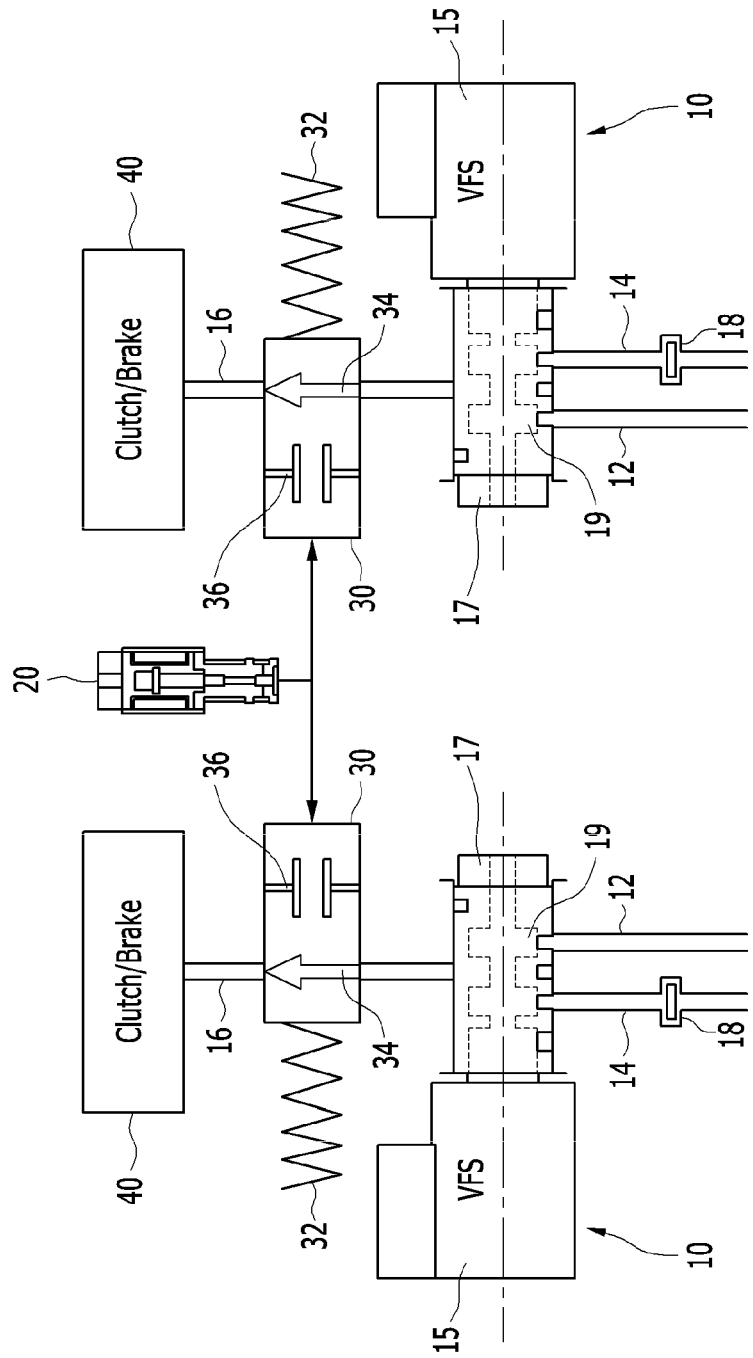
FIG. 1 is a schematic diagram showing a state in which a hydraulic circuit for an automatic transmission according to an exemplary embodiment of the present invention is not operated.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

An exemplary embodiment of the present invention will hereinafter be described in detail with reference to the accompanying drawings.

Figure 2:
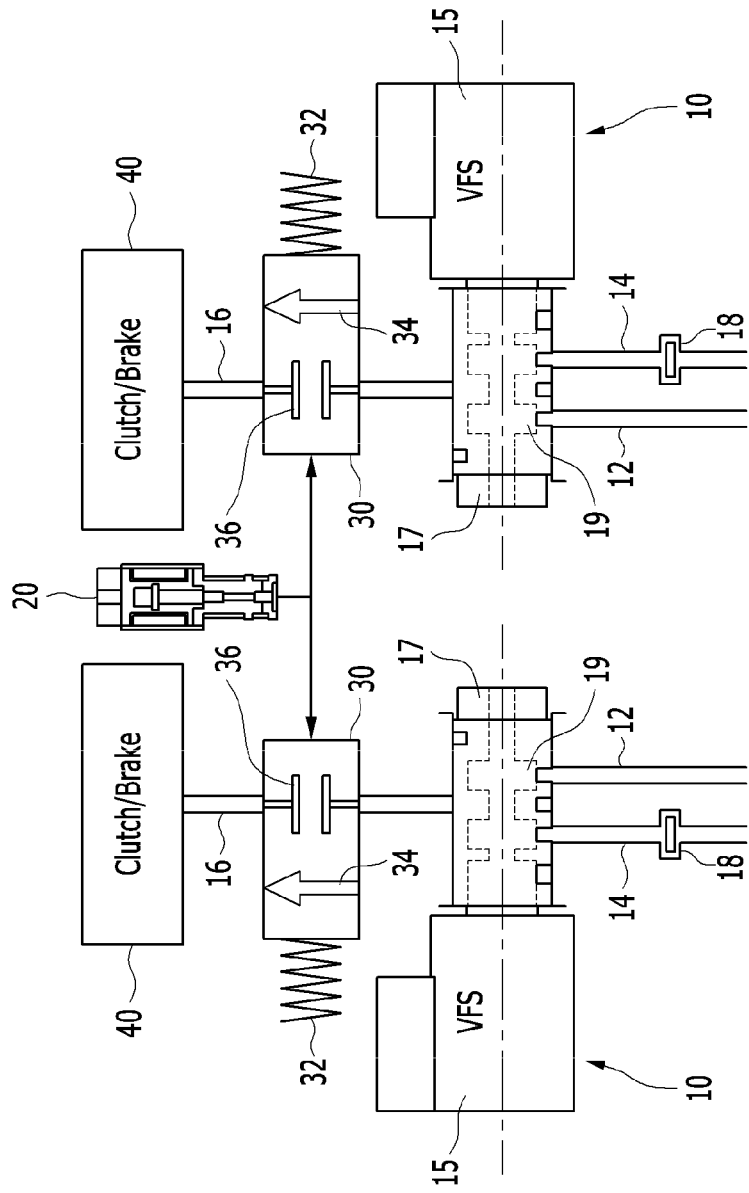
FIG. 2 is a schematic diagram showing a state in which a hydraulic circuit for an automatic transmission according to an exemplary embodiment of the present invention is operated.

FIG. 1 is a schematic diagram showing a state in which a hydraulic circuit for an automatic transmission according to an exemplary embodiment of the present invention is not operated, and FIG. 2 is a schematic diagram showing a state in which a hydraulic circuit for an automatic transmission according to an exemplary embodiment of the present invention is operated.

As shown in FIG. 1 and FIG. 2, a hydraulic circuit for an automatic transmission according to an exemplary embodiment of the present invention is a circuit which supplies hydraulic pressure to a friction member 40, such as a clutch or a brake. In addition, a hydraulic circuit for an automatic transmission according to an exemplary embodiment of the present invention includes a proportional control solenoid valve 10, an inflow hydraulic path 12, an outflow hydraulic path 14, a check valve 18, a supply hydraulic path 16, an on/off solenoid valve 20, a switch valve 30, and an elastic member 32.

Generally, a plurality of friction members 40 are disposed in an automatic transmission, and at least one proportional control solenoid valve 10 is connected to each friction member 40.

The proportional control solenoid valve 10 controls hydraulic pressure such that an operating hydraulic pressure required by the friction member 40 is supplied to the friction member 40.

The automatic transmission friction member 40 and the proportional control solenoid valve 10 are well-known to a person of ordinary skill in the art such that a detailed description thereof will be omitted.

The proportional control solenoid valve 10 may be connected with a plurality of hydraulic paths including the inflow hydraulic path 12, the outflow hydraulic path 14, and the supply hydraulic path 16.

The inflow hydraulic path 12 is formed to supply oil to the proportional control solenoid valve 10. In addition, the outflow hydraulic path 14 is formed to exhaust oil from the proportional control solenoid valve 10. Further, operating hydraulic pressure supplied from the proportional control solenoid valve 10 to the friction member 40 is determined according to an amount of oil flowing into the proportional control solenoid valve 10 through the inflow hydraulic path 12 and an amount of oil exhausted from the proportional control solenoid valve 10 through the outflow hydraulic path 14. However, it is not limited thereto, and the mechanism adapted to control hydraulic pressure generated from the proportional control solenoid valve 10 according to an operating hydraulic pressure required by the friction member 40 can be variously designed by a person of ordinary skill in the art.

The check valve 18 is disposed on the outflow hydraulic path 14. Further, the check valve 18 is adapted to selectively open/close the outflow hydraulic path 14. That is, oil is exhausted from the proportional control solenoid valve 10 through the outflow hydraulic path 14 when the check valve 18 opens the outflow hydraulic path 14. In addition, oil exhausted through the outflow hydraulic path 14 is stopped when the check valve 18 closes the outflow hydraulic path 14.

The supply hydraulic path 16 is adapted to connect the proportional control solenoid valve 10 with the friction member 40. In addition, the supply hydraulic path 16 is a hydraulic path which is formed to supply operating hydraulic pressure of the friction member 40 generated from the proportional control solenoid valve 10 to the friction member 40.

The switch valve 30 is disposed in the supply hydraulic path 16. In addition, the switch valve 30 adapted to selectively open/close the supply hydraulic path 16. One end of the switch valve 30 is connected to the on/off solenoid valve 20, and the other end of the switch valve 30 is connected with the elastic member 32.

The on/off solenoid valve 20 performs a function of an actuator which operates the switch valve 30. In addition, the on/off solenoid valve 20 is an electric valve which is turned on and off by an electromagnet. The on/off solenoid valve 20 is well-known to a person of ordinary skill in the art such that a detailed description thereof will be omitted.

The elastic member 32 is provided for returning the switch valve 30 to its original position. The elastic member 32 may be a coil spring.

The switch valve 30 includes an opening unit 34 and a closing unit 36.

The opening unit 34 is adapted to open the supply hydraulic path 16 and supply operating hydraulic pressure generated from the proportional control solenoid valve 10 to the friction member 40.

The closing unit 36 is adapted to close the supply hydraulic path 16 and stop supplying operating hydraulic pressure generated from the proportional control solenoid valve 10 to the friction member 40.

As shown in FIG. 1, the elastic member 32 pushes the switch valve 30 in one direction if the on/off solenoid valve 20 is turned off. Thus, the opening unit 34 is disposed on the supply hydraulic path 16, and an operating hydraulic pressure is supplied to the friction member 40.

As shown in FIG. 2, the on/off solenoid valve 20 pushes the switch valve 30 in an opposite direction if the on/off solenoid valve 20 is turned on. Thus, the closing unit 36 is disposed in the supply hydraulic path 16, and the supply of operating hydraulic pressure is stopped.

When supply of operating hydraulic pressure to the friction member 40 is stopped by the switch valve 30, an operation to remove foreign materials having flowed into the proportional control solenoid valve 10 may be performed.

The proportional control solenoid valve 10 includes an actuator 15, an operating unit 17, and a spool 19.

The actuator 15 is operated by receiving a current, and is a power source of the operating unit 17.

The operating unit 17 is a portion forming the inflow hydraulic path 12, the outflow hydraulic path 14, and the supply hydraulic path 16. In addition, the operating unit 17 is operated so as to selectively connect the inflow hydraulic path 12 or the outflow hydraulic path 14 with the supply hydraulic path 16 by power of the actuator 15.

The spool 19 is disposed in the operating unit 17, and reciprocates in the operating unit 17 so as to selectively connect the hydraulic paths 12, 14, and 16 of the operating unit 17. That is, the spool 19 is adapted to be reciprocated by power of the actuator 15.

The actuator 15, the operating unit 17, and the spool 19 disposed at the proportional control solenoid valve 10 are well-known to a person of ordinary skill in the art such that a detailed description thereof will be omitted.

Foreign materials having flowed into the proportional control solenoid valve 10 can be exhausted by using the reciprocal motion of the spool 19.

The shape of the spool 19 is represented in FIG. 1 and FIG. 2. Herein, the shapes of the spool 19 and the hydraulic paths 12, 14, and 16 may be variously changed by design of a person of ordinary skill in the art.

Hereinafter, the operation to remove foreign materials having flowed into the proportional control solenoid valve 10 while an operating hydraulic pressure is not supplied to the friction member 40 will be described.

The operation of the proportional control solenoid valve 10 is not influenced by the operation of the friction member 40 if supply of operating hydraulic pressure to the friction member 40 is stopped. Therefore, free reciprocation of the spool 19 by the actuator 15 is possible while operating hydraulic pressure is not supplied to the friction member 40. In addition, foreign materials having flowed into the proportional control solenoid valve 10 can be removed by reciprocal motion of the spool 19. Further, efficiency in removing foreign materials can be maximized when the spool 19 reciprocates a full stroke.

Meanwhile, a hydraulic circuit for an automatic transmission according to an exemplary embodiment of the present invention including the proportional control solenoid valve 10 and the switch valve 30 is applied to each friction member 40 provided in plural in an automatic transmission, and the switch valves 30 respectively connected to the plurality of friction members 40 can be simultaneously operated.

In other words, each of the switch valves 30 are simultaneously operated according to turning one on/off solenoid valve 20 on or off if each of the switch valves 30 connected to the plurality of friction members 40 are connected with the one on/off solenoid valve 20.

For example, each of the switch valves 30 connected to the plurality of friction members 40 are operated so as to stop supply of operating hydraulic pressure during a predetermined time in a predetermined shift speed, and simultaneously, the spool 19 is reciprocated a full stroke such that foreign materials are removed from each proportional control solenoid valve 10 connected to the plurality of friction members 40.

The predetermined shift speed may be P-range, and the predetermined time may be 2 seconds after a brake is released in the P-range. Further, the predetermined shift speed and the predetermined time may be variously changed by a person of ordinary skill in the art.

According to an exemplary embodiment of the present invention, performance of an automatic transmission can be improved and driver satisfaction can be ensured as foreign materials in a hydraulic circuit are rapidly and effectively removed.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. They are not intended to be exhaustive or to limit the invention to the precise forms disclosed, and obviously many modifications and variations are possible in light of the above teachings as well as various alternatives and modifications thereof. It is intended that the scope of the invention be defined by the Claims appended hereto and their equivalents.

What is claimed is:

1. A hydraulic circuit for an automatic transmission that is adapted to supply hydraulic pressure to a plurality of friction members provided in the automatic transmission so as to realize a plurality of shift speeds, the hydraulic circuit comprising:
    a plurality of proportional control solenoid valves controlling the hydraulic pressure such that an operating hydraulic pressure required by the friction members is supplied to the friction members;
    a plurality of supply hydraulic paths each connecting a corresponding one of the proportional control solenoid valves with a corresponding one of the friction members, and adapted to supply the operating hydraulic pressure controlled by the corresponding proportional control solenoid valve to the corresponding friction member;
    a plurality of switch valves each disposed in a corresponding one of the supply hydraulic paths so as to selectively open or close the corresponding supply hydraulic path;
    an on/off solenoid valve operating at least two of the switch valves; and
    an elastic member provided to each of the at least two switch valves for returning the switch valves to an original position,
    wherein foreign materials having flowed into the proportional control solenoid valves which are connected with the friction members are simultaneously removed in a case in which the plurality of switch valves are connected with the one on/off solenoid valve by stopping the switch valves and operating the one on/off solenoid valve in a full stroke.

2. The hydraulic circuit of claim 1, further comprising:
    an inflow hydraulic path connected to the proportional control solenoid valves and provided for supplying oil to the proportional control solenoid valves; and
    an outflow hydraulic path connected to the proportional control solenoid valves and provided for exhausting oil from the proportional control solenoid valves.

3. The hydraulic circuit of claim 2, wherein the operating hydraulic pressure supplied to the friction members is controlled according to the oil flowing into the proportional control solenoid valves through the inflow hydraulic path and the oil exhausted from the proportional control solenoid valves through the outflow hydraulic path.

4. The hydraulic circuit of claim 1, each of the at least two switch valves comprising:
    an opening unit formed to open the supply hydraulic path when the opening unit is engaged in the supply hydraulic path; and a closing unit formed to close the supply hydraulic path when the closing unit is engaged in the supply hydraulic path, wherein the closing unit is engaged in the supply hydraulic path when the switch valve is operated, and the opening unit is engaged in the supply hydraulic path when the switch valve returns to the original position.

5. The hydraulic circuit of claim 1, wherein an operation to remove the foreign materials having flowed into the proportional control solenoid valves is performed in a state of closing the supply hydraulic path.

6. The hydraulic circuit of claim 5, wherein each proportional control solenoid valve includes a spool which reciprocates in the proportional control solenoid valve such that the operating hydraulic pressure generated from the proportional control solenoid valves is controlled, and the foreign materials having flowed into the proportional control solenoid valves are removed by a reciprocal motion of the spools in the state of closing the supply hydraulic path.

* * * * *